United States Patent [19]

Kiko

[11] Patent Number: 4,961,218

[45] Date of Patent: Oct. 2, 1990

[54] ENHANCED LINE POWERED AMPLIFIER

[75] Inventor: Frederick J. Kiko, Carlsbad, Calif.

[73] Assignee: Tollgrade Communications, Inc., Erie, Pa.

[21] Appl. No.: 352,863

[22] Filed: May 17, 1989

[51] Int. Cl.⁵ .............................................. H04B 3/36
[52] U.S. Cl. ..................................... 379/347; 379/345
[58] Field of Search ............... 379/338, 344, 340, 398, 379/346, 347, 406, 390, 404, 402, 345; 333/213; 340/425

[56] References Cited

U.S. PATENT DOCUMENTS

| | | | |
|---|---|---|---|
| 2,742,616 | 4/1956 | Merrill, Jr. | 379/346 X |
| 2,998,581 | 8/1961 | Dimmer | 379/346 X |
| 3,109,147 | 10/1963 | Witt | 333/213 |
| 4,229,625 | 10/1980 | Derby et al. | 379/347 X |
| 4,277,655 | 7/1981 | Surprenant | 379/347 X |
| 4,700,382 | 10/1987 | Means et al. | 379/390 |
| 4,706,862 | 12/1972 | Chambers, Jr. | 379/347 X |
| 4,831,651 | 5/1989 | Vesterinen | 379/347 |

OTHER PUBLICATIONS

"Self Balancing Line Hybrid", IBM Technical Disclosure Bulletin vol. 29, No 2, Jul. 1986, pp. 584–585.

*Primary Examiner*—Jin F. Ng
*Assistant Examiner*—Randall S. Vaas
*Attorney, Agent, or Firm*—Davis Chin

[57] ABSTRACT

An enhanced amplifier for interconnecting a two-wire, bidirectional cable side transmission path and a two-wire bidirectional equipment side transmission path in a communication system includes a first hybrid splitter and a second hybrid splitter. The first hybrid splitter is formed of a cable-to-equipment voltage sense amplifier, a shunt current driver, and a series current compensator for generating a first simulated terminating impedance. The second splitter is formed of an equipment-to-cable voltage sense amplifier, the shunt current driver and the series current compensator for generating a second simulated terminating impedance. Other features disclosed include automatic gain adjustment circuitry for automatically setting the gain in gain/equalizer circuits to a fixed level. Further, auto-balancing circuitry is provided for adjusting automatically and continuously both equipment and cable side balance networks.

12 Claims, 8 Drawing Sheets

ENHANCED LINE POWERED AMPLIFIER

BACKGROUND OF THE INVENTION

1. Field of the Invention:

This invention relates generally to telephone communication systems employing bidirectional voice frequency repeaters and more particularly, it relates to an enhanced line powered amplifier, which functions as a bidirectional voice frequency repeater, having automatic gain adjustment circuitry and auto-balancing circuitry for both equipment and cable side balance networks.

2. Description of the Prior Art:

As is generally known, it is often required to enhance signals which are being transmitted over a 2-wire bidirectional transmission path in telephone and other similar communication systems. In addition, it is often necessary to couple a 2-wire bidirectional transmission path to unidirectional sections of a 4-wire transmission path. For example, bidirectional signals in a telephone system are carried over the 2-wire suscriber loop but must be split into separate transmit and receive unidirectional signals at the central office and at the subscriber terminal. Signal enhancement in the bidirectional 2-wire transmission path is typically achieved by various forms of hybrid circuits to couple the 2-wire path to the separate unidirectional sections, each including unidirectional amplifiers.

Standard hybrids for analog voice frequency signals utilize multiwinding transformers arranged to couple signals from the transmit port to the 2-wire access port and to couple signals from the 2-wire access port to the receiving port. Further, it is desired that such hybrids also present to the 2-wire access port an impedance equal to the characteristic impedance of the connected 2-wire line in order to avoid the occurrence of a reflected signal and consequent echo. In addition, precision balancing networks have been used in these hybrid arrangements to match the impedance of the incoming lines.

However, it is known that the characteristic impedance of real 2-wire telephone lines is not purely a resistive impedance but has complex impedances with certain frequency-sensitive variations. As a result, it has been extremely difficult to adjust continuously the balancing networks so as to match the characteristic line impedance. Accordingly, most of the prior art bidirectional repeater circuits have suffered from the disadvantages of frequency instability and/or echo signals.

Examples of various prior art hybrid circuits, hybrid repeaters, and associated circuitry are shown and described in U.S. Pat. No. 4,331,842 to Kiko; U.S. Pat. No. 4,192,978 to Vincent; U.S. Pat. No. 4,181,824 to Seidel; U.S. Pat. No. 4,074,087 to Blake, Jr. et al.; U.S. Pat. No. 4,168,878 to Hashemi; U.S. Pat. No. 4,064,377 to Regan; U.S. Pat. No. 4,063,187 to Orchard; U.S. Pat. No. 4,174,470 to Seidel; U.S. Pat. No. 3,963,876 to Holtz et al.; and U.S. Pat. No. 3,689,711 to Earle et al.

It would be desirable to provide an enhanced line powered amplifier for effecting amplification in a 2-wire bidirectional transmission path which includes automatic gain adjustment circuitry for automatically setting the gain to a fixed level. It would also be expedient to provide an enhanced line powered amplifier which can automatically adjust the balance networks on both the equipment and cable sides. Further, the hybrid repeater is formed of a voltage sense amplifier, a shunt current driver and a shunt current compensator. Gain/equalizer circuits are switchable between a loaded cable and a non-loaded cable.

SUMMARY OF THE INVENTION

Accordingly, it is a general object of the present invention to provide an enhanced amplifier for interconnecting a two-wire bidirectional cable side transmission path and a two-wire, bidirectional equipment side transmission path which is of a simplified, low power, low cost design and thus more economical to manufacture and install as compared to other prior art voice frequency repeaters. It is an object of the present invention to provide an enhanced amplifier which includes automatic gain adjustment circuitry for automatically setting the gain in gain/equalizer circuitry to a fixed level.

It is another object of the present invention to provide an enhanced amplifier which includes autobalancing circuitry for adjusting automatically and continuously both the equipment and cable side balance networks.

It is still another object of the present invention to provide an enhanced amplifier which includes gain correcting circuits and switch means movable from a non-loaded cable position to a loaded cable position.

It is yet still another object of the present invention to provide an enhanced amplifier which includes a power extractor circuit coupled between coils in a D.C. bypass line for generating positive and negative d.c. supply voltages for the line powered amplifier.

In accordance with these aims and objectives, the present invention is concerned with the provision of an enhanced amplifier for interconnecting a two-wire, bidirectional cable side transmission path and a two-wire, bidirectional equipment side transmission path in a communication system. The amplifier includes a first hybrid splitter circuit and a second hybrid splitter circuit. The first hybrid splitter circuit is coupled to receive first signals originating from the cable side transmission path and arriving at a cable side port for amplifying and transmitting the first signals to the equipment side transmission path via an equipment side port. The second hybrid splitter circuit is coupled to receive second signals originating from the equipment side transmission path and arriving at an equipment side port for amplifying and transmitting the second signals to the cable side transmission path via the cable side port.

The first splitter circuit includes a cable-to-equipment voltage sense amplifier, a shunt current driver, and a series current compensator. The cable-to-equipment voltage sense amplifier is coupled to the cable side port for generating a cable side voltage. The shunt driver and the series current compensator are responsive to the cable side voltage for generating a first current which is passed to the cable side transmission path to provide a first simulated terminating impedance. The second splitter circuit includes an equipment-to-cable voltage sense amplifier, the shunt current driver and the series current compensator. The equipment-to-cable sense amplifier is coupled to the equipment side port for generating an equipment side voltage. The shunt driver and the series current compensator are responsive to the equipment side voltage for generating a second current which is passed to the equipment side transmission path to provide a second simulated terminating impedance.

In another aspect of the present invention, there is provided an improved hybrid repeater which does not really terminate the line and regenerate the signal at the other side with gain. A shunt current driver is used to generate a simulated 600 ohms termination and generates only a net current that is required to be passed to the other side. As a result, power consumption is significantly reduced due to the smaller current requirement and permits reduction of the size of the coupling capacitor which is desired because of signaling (20 Hz. dialing) attenuation.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
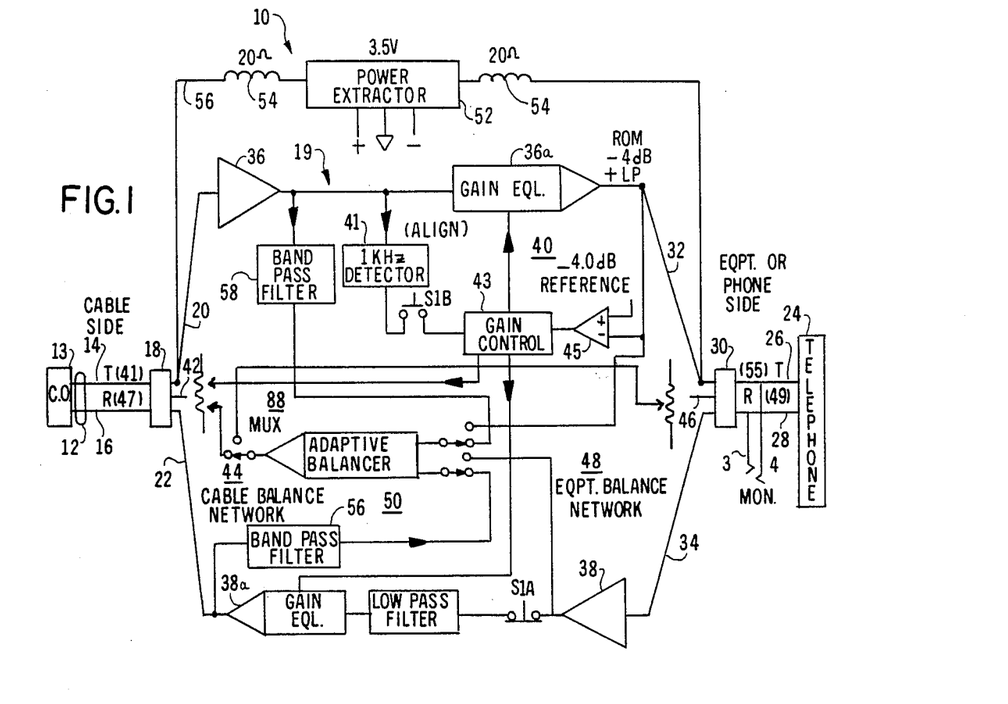
FIG. 1 is a simplified block diagram of a bidirectional 2-wire communication system utilizing an enhanced line powered amplifier incorporating the principles of the present invention.

Referring now in detail to the drawings, there is shown in FIG. 1 a general telephone communication system which utilizes an enhanced line powered amplifier 10 incorporating the principles of the present invention. One side (cable) of a two-wire transmission line 12 is connected to the central office equipment in a central office 13 via a 2-wire cable pair. The enhanced line powered amplifier 10 is comprised of a hybrid splitter circuit 18, a four-wire circuit 19, a hybrid splitter circuit 30, a cable balance network 44, an equipment balance network 48, automatic gain adjustment circuitry 40, auto-balancing circuitry 50, and a power extractor circuit 52. The cable side of the transmission line 12 is also connected to the central office's tip and ring leads 14, 16 which are coupled through a 2-wire cable pair to the hybrid circuit 18.

A subscriber's telephone 24 is connected to the subscriber's tip and ring leads 26, 28 which are coupled to the hybrid circuit 30. The left side of the four-wire circuit 19 is connected to the hybrid circuit 18 via a transmit line 20 and a receive line 22. The right side of the four-wire circuit 19 is connected to the hybrid circuit 30 via a receive line 32 and a transmit line 34.

The four-wire circuit 19 includes an amplifier 36 used to amplify audio or voice frequency signals in the eastward direction and an amplifier 38 used to amplify audio or voice frequency signals in the westward direction. The automatic gain adjustment circuitry 40 is used to facilitate the initial setting of the gains for the gain/equalizer networks 36a, 38a as will be described hereinafter. The hybrid circuit 18 includes a terminal 42 which is connected to the cable balance network 44. The hybrid circuit 30 includes a terminal 46 which is connected to the equipment balance network 48. The auto-balancing circuitry 50 is used to adjust automatically and continuously both the equipment and cable side balance networks 48, 44 so as to match the varying line impedances.

The power extractor circuit 52 is used to extract a portion of the voltage appearing in the transmission line 12. The power extractor circuit 52 is connected in series between the coils 54 in a D.C. bypass line 56. The coils are used to block A.C. current but permits D.C. current to pass from the central office (cable) side to the subscriber equipment) side. The circuit 52 includes a polarity guard to accommodate reverse battery operation and then generates supply voltages of approximately ±3.5 volts for use by the line powered amplifier 10.

Figure 5:
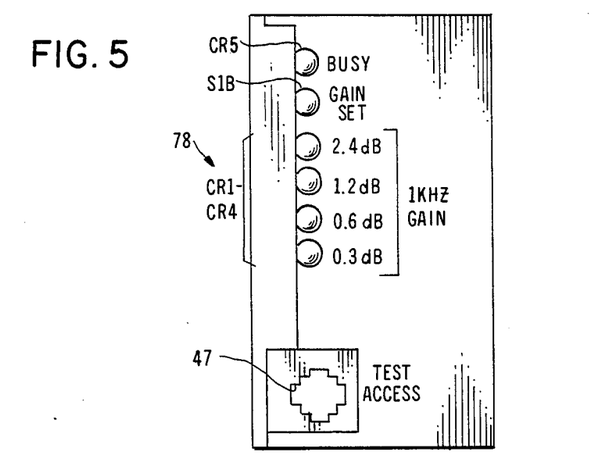
FIG. 5 is a diagram of a face plate showing the various indicator light-emitting diodes and test access jack.

The automatic gain adjustment circuitry 40 includes a 1 KHz detector 41 connected to the output of the amplifier 36, a push-button switch S1B, a gain control circuit 43, a dBm reference amplifier 45. Normally, after the line powered amplifier 10 is installed the installer will uses a butt-in or telephone set to connect to the equipment side via test access jack 47 (FIG. 5) and dials up a milliwatt value, which is 3 dBm at 1 KHz. This 1 KHz signal will be attenuated by the transmission line 12 to about −4 to −8 dBm level and will arrive on the transmit line 20.

The amplifier 36 will pass this signal to the detector 41 where it is detected. When the switch S1B is depressed, the reference amplifier 45 will cause the gain control circuit 43 to increase the output of the gain/equalizer network 38a until it reaches the −4 dBm level. The gain will now be stopped from increasing and will be locked-in by the gain control circuit 43. It is important to note that when the switch S1B is depressed, the switch S1A will be opened. As a result, the impedance of the telephone 24 connected to the tip and ring leads 26, 28 will not affect the reference level set by the reference amplifier 45 as well as the gain adjust alignment.

The auto-balancing circuitry 50 includes a correlator/multiplier and a multiplexer 88 for alternately switching between the cable side balance network 44 and the equipment side balance network 48. When signals are originating from the equipment side, the auto-balancing circuitry 50 will receive on its one input the signal from the amplifier 38a via a bandpass filter 56 which will be at a relatively high level. This high level signal will also be passed to the amplifier 36 via the transmit line 20 since the cable balance network 44 is never perfectly balanced. The output signal from the amplifier 36 is sent through a bandpass filter 58 to the other input of the auto-balancing circuitry 50.

The balancing circuitry compares these two input signals and generates an error signal on its output when there is a correlation. The error signal is used to adjust the cable balance network 44 so as to minimize the correlation and thus achieve the optimal balance. The balancing circuit 50 will perform this adjustment only when the input signal from the amplifier 38 via bandpass filter 56 is higher than the other input signal from the amplifier 36 via the bandpass filter 58, thereby indicating that the signal is originating from the equipment side.

Similarly, if signals are originating from the cable side and the multiplexer 88 is switched over, the output from the gain/equalizer network 36a being of a higher level will be compared with the output from the amplifier 38 by the correlator. If there is a correlation, the output error signal from the balancing circuit 50 will cause the equipment side balance network 48 to be adjusted so as to minimize the correlation.

Figure 2:
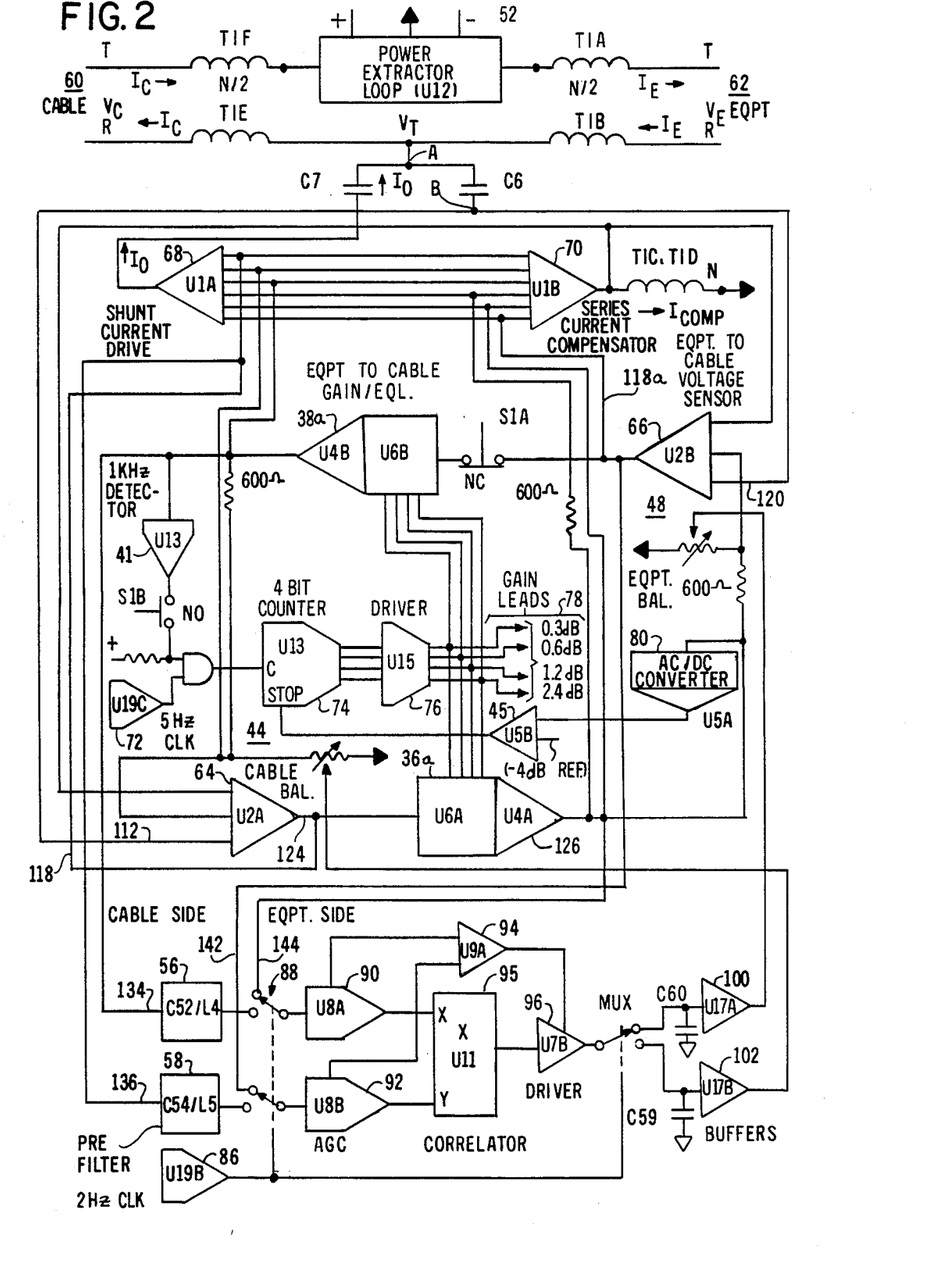
FIG. 2 is a more detailed block diagram of the enhanced line powered amplifier of the present invention.

Referring now to FIG. 2, there is illustrated a more detailed block diagram of the enhanced line powered amplifier 10 of the present invention. A transformer T1 is provided with four primary windings T1F, T1E, T1A, T1B for coupling the D.C. voltages from the cable side 60 to the equipment side 62. The transformer T1 is also formed with a pair of secondary windings T1C and T1D. It will be noted that all of the primary windings have the same number of turns. Further, the total number of turns due to the windings T1F and T1E on the cable side are made to be equal to the same number of turns on the secondary windings T1C and T1D. Similarly, the total number of turns due to the windings T1A and T1B on the equipment side are also made equal to the number of turns on the secondary windings. The power extractor circuit 52 is coupled between the windings T1F and T1A.

The hybrid circuit 18 is comprised of a cable-to-equipment voltage sense amplifier 64, a shunt current driver 68, and a series current compensator 70. The hybrid circuit 30 is comprised of an equipment-to-cable voltage sense amplifier 66, the shunt current driver 68, and the series current compensator 70. The automatic gain adjustment circuitry 40 includes the 1 KHz detector 41, the switch S1B, a $-5$ Hz clock generator 72, a 4-bit counter 74, a buffered driver 76, gain light emitting diodes (LEDs) indicators 78, a AC/DC converter 80, and the $-4.0$ dBm reference amplifier 45. The auto-balancing circuitry 50 includes the bandpass filter 56, the bandpass filter 58, a 2 Hz clock generator 86, the multiplexer 88, automatic-gain control (AGC) amplifiers 90 and 92, a direction detector 94, a driver 96, a correlator/multiplier 95, integrating/holding capacitors C59, C60, and buffers 100, 102.

Figure 3A:
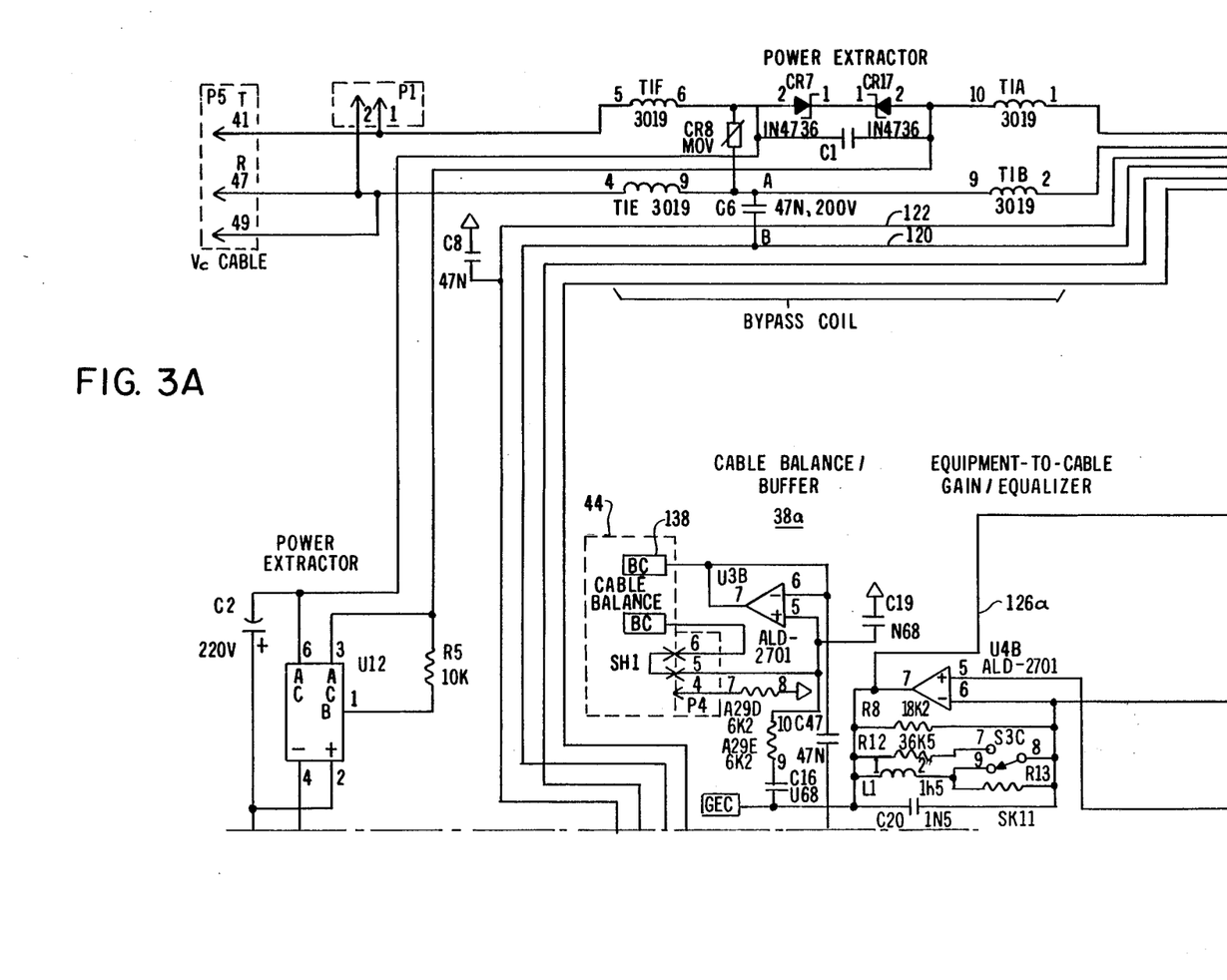
FIGS. 3A, 3B, 3C, and 3D when connected together, are detailed schematic circuit diagrams of the enhanced line powered amplifier constructed in accordance with the present invention, except for the balancing networks and the auto-balancing circuitry.

In FIGS. 3A-3D, there is shown a detailed schematic circuit diagram of the various blocks used to form the voltage sense amplifier 64, voltage sense amplifier 66, shunt current driver 68, series current compensator 70, and the automatic gain adjustment circuitry 40 of FIG. 2. In FIGS. 4A and 4B, there is illustrated a detailed schematic circuit diagram of the various blocks used to form the cable side balance network 44, the equipment side balance network 48, and the auto-balancing circuitry 50 of FIG. 2.

Referring now to FIG. 2 and FIGS. 3A-3D, the power extractor circuit 52 includes a polarity guard I.C. chip U12, a DC-to-DC converter 104, and a clock oscillator 106. The + or − input to the chip U12 (FIG. 3A) is taken across a capacitor C1 via pins 3 and 6. The chip U12 rectifies the input of either polarity to provide Dc outputs on pins 2 and 4. Zener diodes CR7 and CR17 are coupled across the capacitor C1 so as to protect the chip U12 against positive and negative transients. A capacitor C2 is connected between the positive DC output (pin 2) and the center tab of the transformer in the tip lead so as to provide an A.C. ground reference back to the junction of the windings T1F and T1A for signal currents.

The DC-to-DC converter 104 (FIG. 3C) receives the positive DC output voltage, which is clamped by a transistor Q11 to typically $+3.5$ volts, and converts the same to $-3.5$ volts. The converter 104 has a shunt regulator formed of a Zener diode U7, a diode CR16, and the clamp transistor Q11 so as to provide a regulated $+3.5$ volts. When this voltage is exceeded, the excess current will be shunted by the transistor Q11 to a light-emitting diode CR5 and a varistor CR27. The diode CR5 is mounted on a face plate (FIG. 5) to indicate when the line powered amplifier is busy as well as the existence of sufficient loop current to power the amplifier.

The converter 104 further includes series-connected N-channel transistors Q2, Q4 and P-channel transistors Q1, Q3 which are coupled between an upper supply rail 108 and a lower supply rail 110. The gates of the transistors Q1–Q4 are driven by the clock oscillator 106 having a frequency of 17 KHz via resistors A15A, A15B and diodes CR13. CR14. When the P-channel transistors Q1 and Q3 are turned on by the negative-going edges of the clock pulses from the oscillator 106 via the resistor A15A, the capacitor C4 is connected in parallel with the capacitor C3, which has a regulated voltage of $+3.5$ volts, and is thus charged up to this voltage. When the N-channel transistors Q2 and Q4 are turned on by the positive-going edges of the clock pulses via the resistor A15B, the capacitor C4 is connected in parallel with the capacitor C5 so as to provide the negative voltage of $-3.5$ volts.

It should be noted that the diodes CR13 and CR14 allow for the quick turn-off of the respective P-channel transistors Q1, Q3 and the N-channel transistors Q2, Q4. On the other hand, the resistors A15A and A15B are used to slowly turn on the respective P-channel transistors Q1, Q3 and N-channel resistors 02, Q4. As a result, a dead band is created so that all of the transistors Q1–Q4 are prevented from being turned on all at the same time, thereby reducing noise and excess power dissipation.

The cable-to-equipment (CE) voltage sense amplifier 64 (U2A) senses the differential voltage $V_T$ across the center taps of the transformer T1 connected in the center taps of the tip lead and the ring lead. The voltage $V_T$ is sensed via a coupling capacitor C6 having its one side connected to the ring lead center tap at node A. The other side of the capacitor C6 at node B is fed via line 112 to the inverting input of the CE voltage sense amplifier 64 (U2A) on its resistor A5A (100 K). It should be noted that all of the U designations in parentheses refer to the I.C chips or circuit components in the detailed schematic circuit diagram of FIGS. 3A-3D. In order to provide a differential input, the non-inverting input of the CE sense amplifier 64 (U2A) is coupled to the ground reference via a line 114 by a capacitor C8 and a resistor A6B (100 k).

However, since the cable voltage $V_c$ at the cable side port 60 is the one actually desired to be sensed in order to generate a 600 ohms simulated terminating impedance, it is required to subtract one-half of the transformer voltage in the winding T1F and one-half of the transformer voltage in the winding T1E. This is accomplished by feeding the voltage sensed across the secondary windings, T1C and T1D via line 116 through pin 6 of the resistor A6E (100 k) on the non-inverting input of the amplifier 64 (U2A). Pins 1 and 4 of resistor A5C (100 k) are connected between the inverting input of the amplifier 64 and a ground potential so as to maintain the amplifier balanced.

Nevertheless, this secondary transformer voltage is actually in error by an amount equal to the voltage drops across the resistance of the secondary windings T1C and T1D. In order to correct for this error, a voltage is sensed across the resistor R4 and is fed to the inverting and non-inverting inputs of the amplifier 64 (U2A) via respective resistors A9D (1.1 M) and A9C (1.1 M). Consequently, the output voltage of the amplifier U2A corresponds very accurately to the cable voltage $V_c$.

Figure 3B:
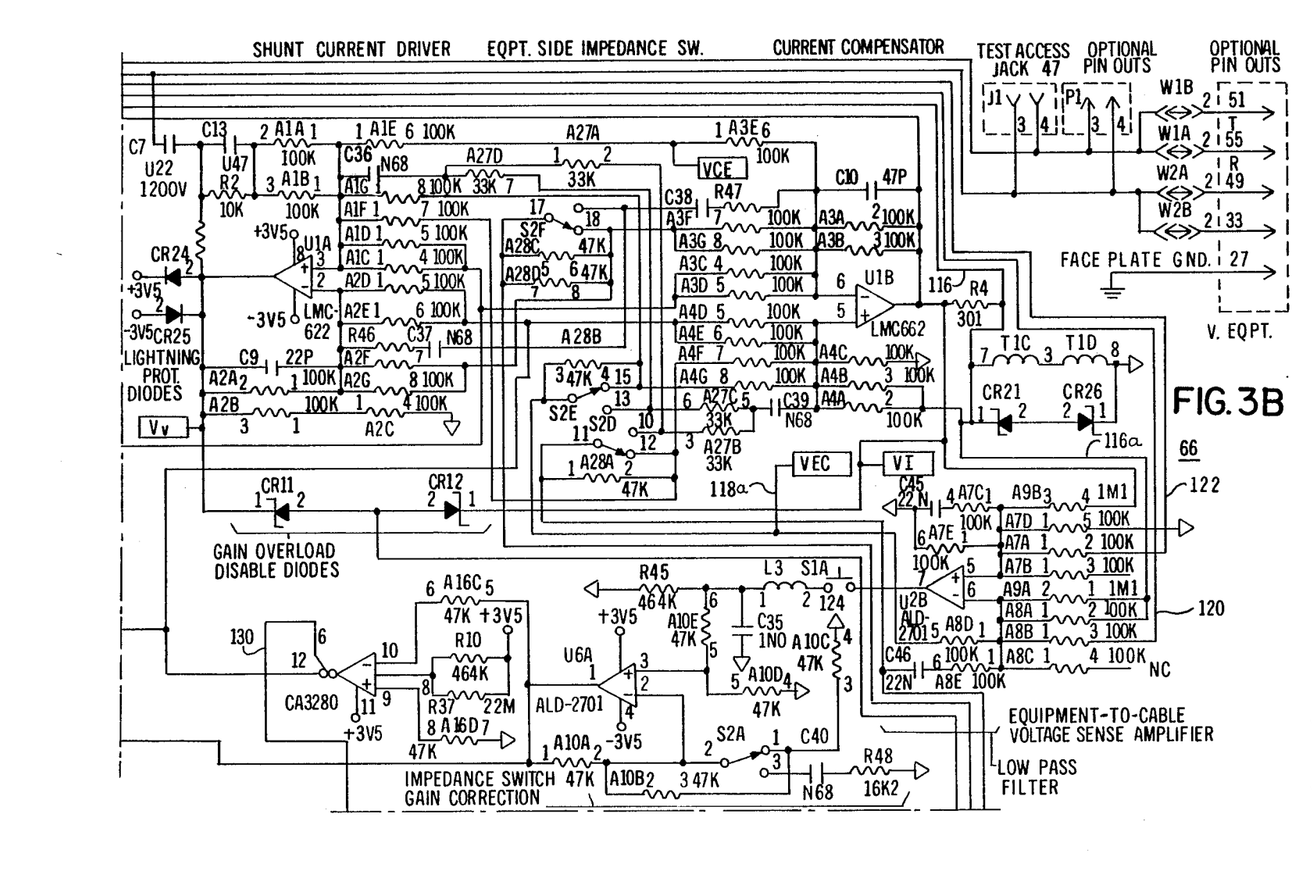
Figure 3C:
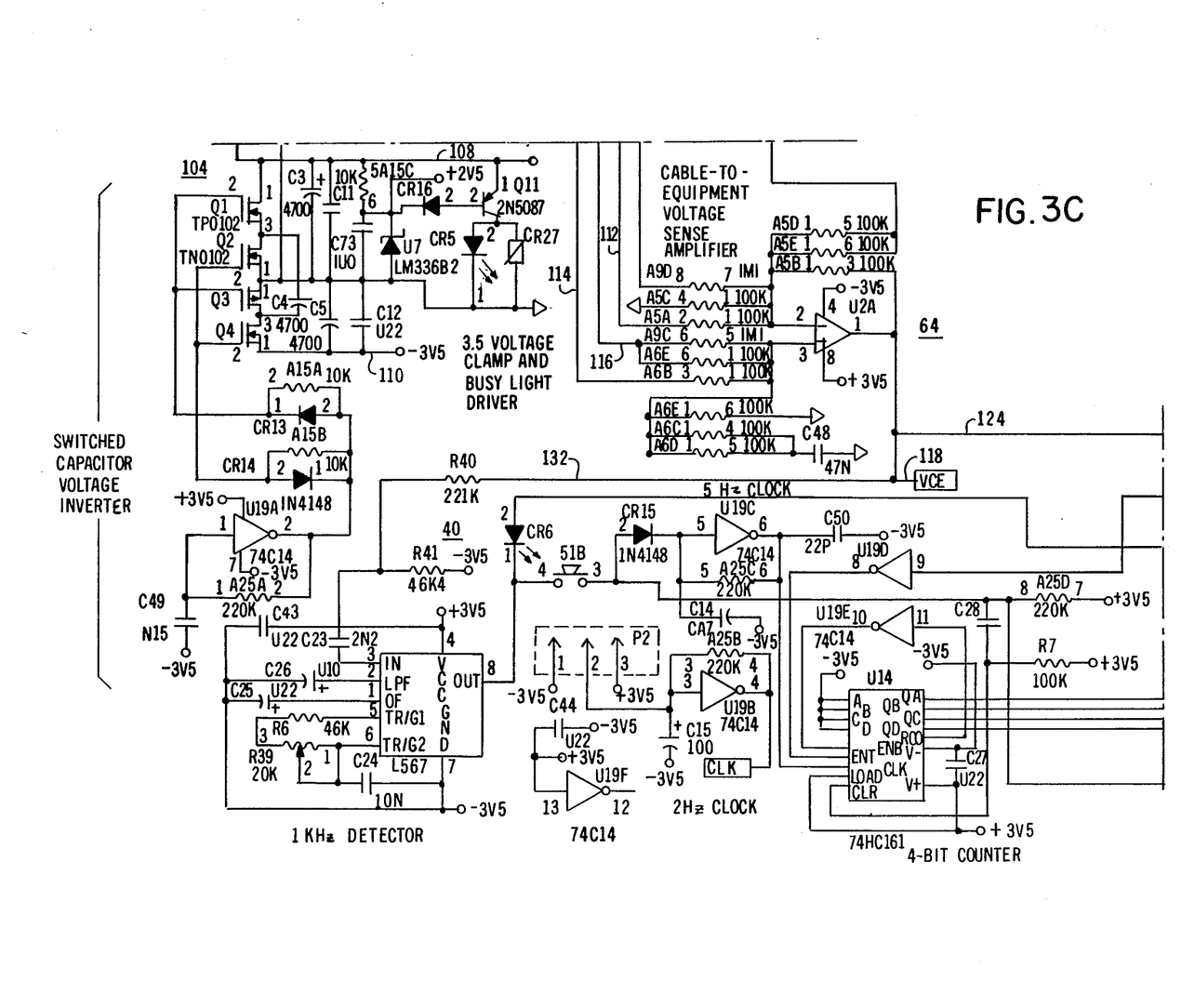
Figure 4A:
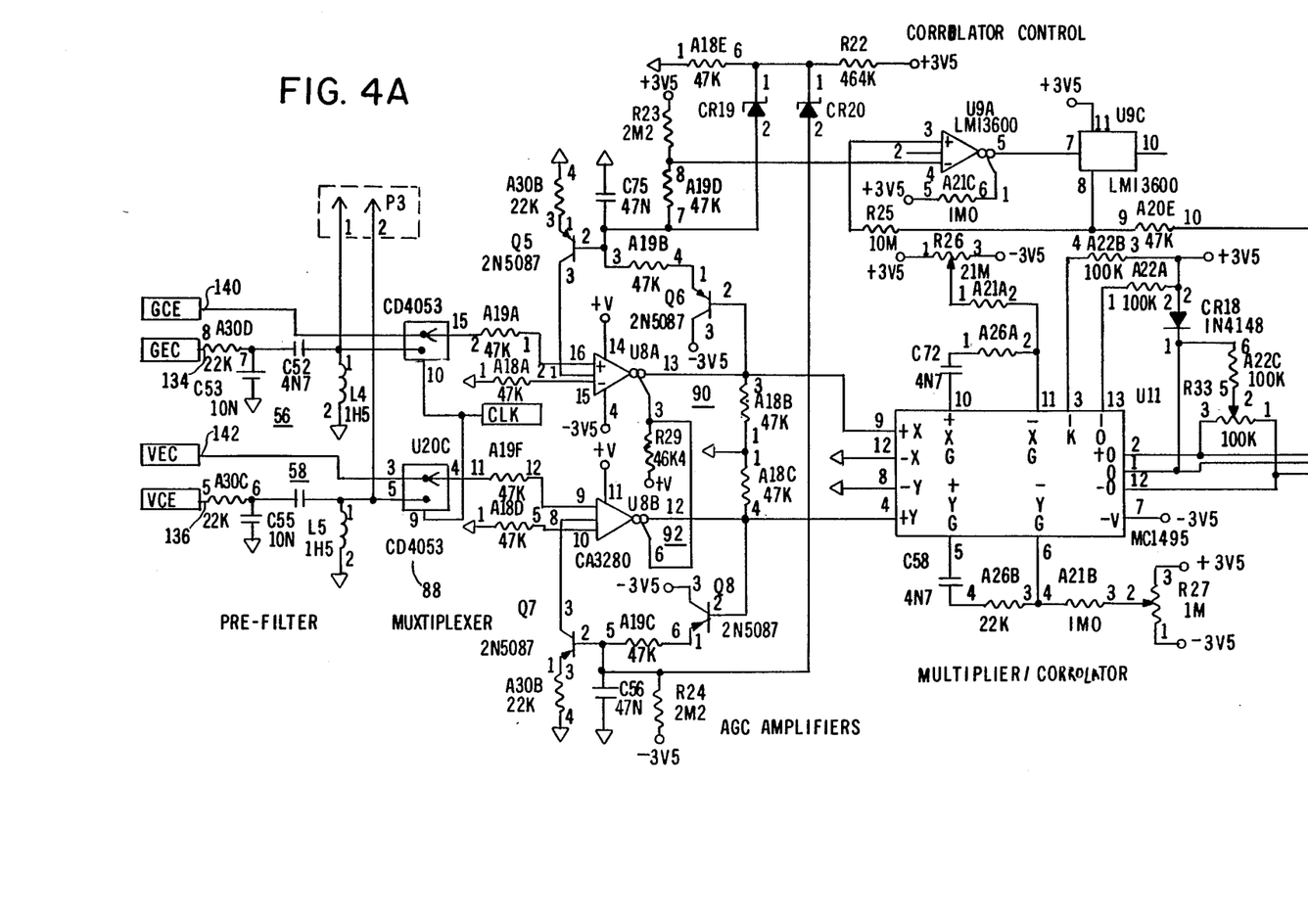
FIGS. 4A and 4B, when connected together, form a detailed schematic diagram of the balancing networks and the auto-balancing circuitry for use in the enhanced line powered amplifier of the present invention.
Figure 4B:
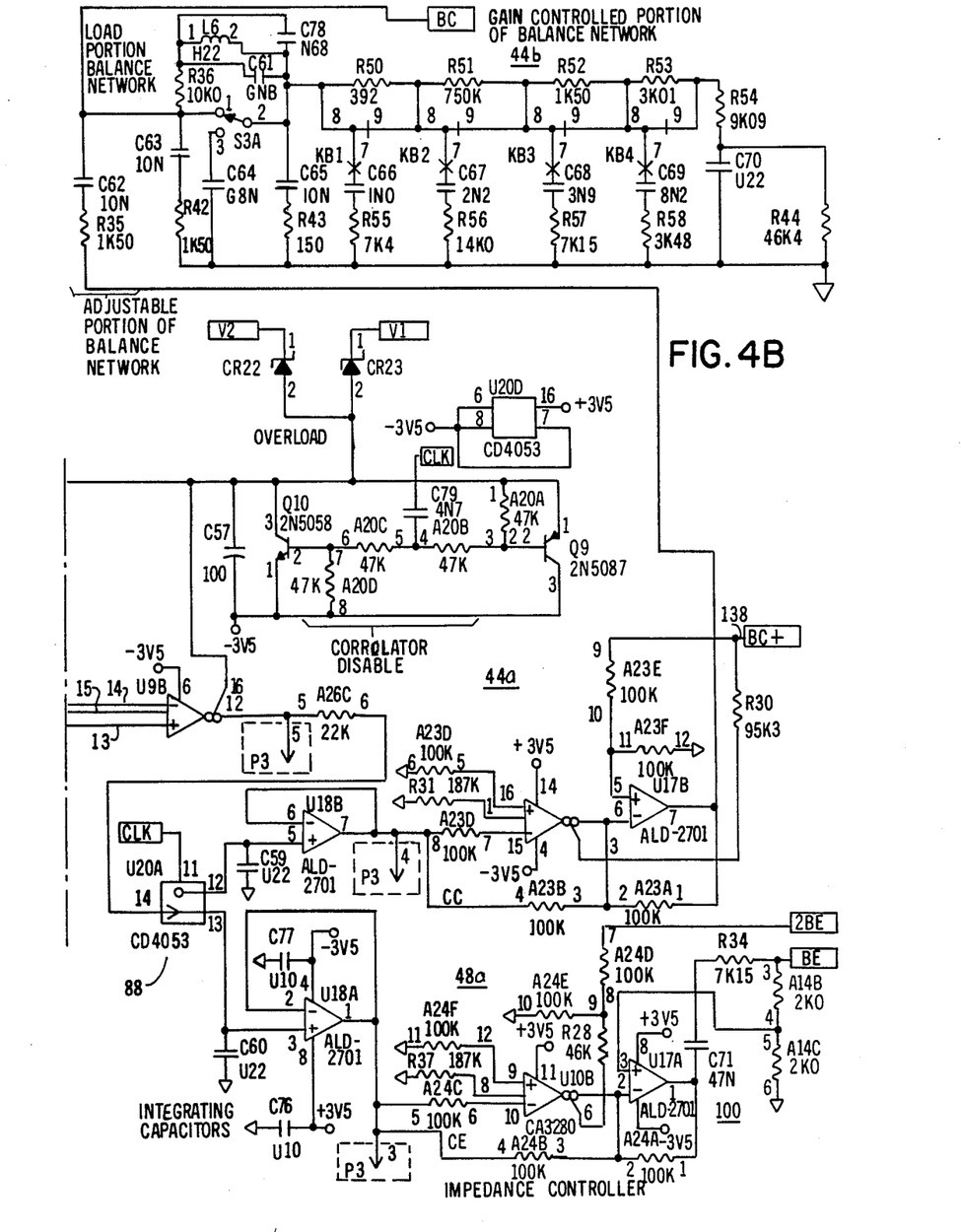

This output voltage of the amplifier U2A is used to drive the shunt current driver 68 (U1A) via line 118 (FIG. 3B). The output of the amplifier U2A is fed into a resistor A1E (100 K) of the shunt current driver U1A, which drives out a current of such magnitude to present the 600 ohms impedance. In order to force this output current from the current driver U1A to the cable side rather than to the ring lead center tap, the output of the current driver U1A also drives the series current compensator 70 (U1B) via the resistor A3E (100 K) which forces that current over to the cable side, thereby creating no net flux in the windings of the transformer T1 from generating the 600 ohms cable side input resistance. In other words, the shunt current from the current driver U1A passes through the windings T1E and T1F and produces some ampere-turns in the transformer T1, which is canceled by the current compensator U1B by generating an equal amplitude current but opposite phase.

Similarly, the equipment-to-cable (EC) voltage sense amplifier 66 (U2B) senses the differential voltage $V_T$ when a signal originates from the equipment side. This voltage $V_T$ is sensed via the same coupling capacitor C6 since the node B is also fed via line 120 to the inverting input of the EC sense amplifier 66 (U2B) on its resistor A8B (100 K). In order to provide the differential input, the non-inverting input of the sense amplifier 66 (U2B) is coupled to the ground potential via line 122 by the capacitor C8 and resistor A7A (100 K).

Again, since the equipment voltage $V_E$ at the equipment side port 62 is the one actually desired to be sensed in order to generate a 600 ohm simulated terminating impedance, it is required to subtract the transformer voltage in the secondary windings. This is accomplished by feeding the voltage sensed across the secondary windings T1C and T1D via line 116a (FIG. 3B) through resistor ABA (100 K) on the inverting input of the EC amplifier 66 (U2B). A resistor A7D (100 K) is connected between the non-inverting input of the amplifier 66 and the ground reference so as to maintain the amplifier balanced.

Nevertheless, this transformer voltage will again be actually in error by the amount equal to the voltage drop across the resistance of the secondary windings. In order to correct for this error, a voltage is sensed across the resistor R4 and is fed to the inverting and non-inverting inputs of the amplifier U2B via respective resistors A9A (1.1 M) and AgB (1.1 M). Consequently, the output voltage from the amplifier U2B corresponds very accurately to the equipment voltage $V_e$. For generating the impedance of 600 ohms on the equipment side, this output voltage from the amplifier U2B is fed on line 118a into resistor A1G (100 K) of the shunt current driver U1A via contacts 14 and 15 of the switch S2E. In order to force this output current from the current driver U1A to the equipment side rather than to the center tap, the output of the current driver U1A also drives the series current compensator U1B via a resistor A4G (100 K) which forces that current over to the equipment side, resulting in no net flux in the windings of the transformer.

Figure 3D:
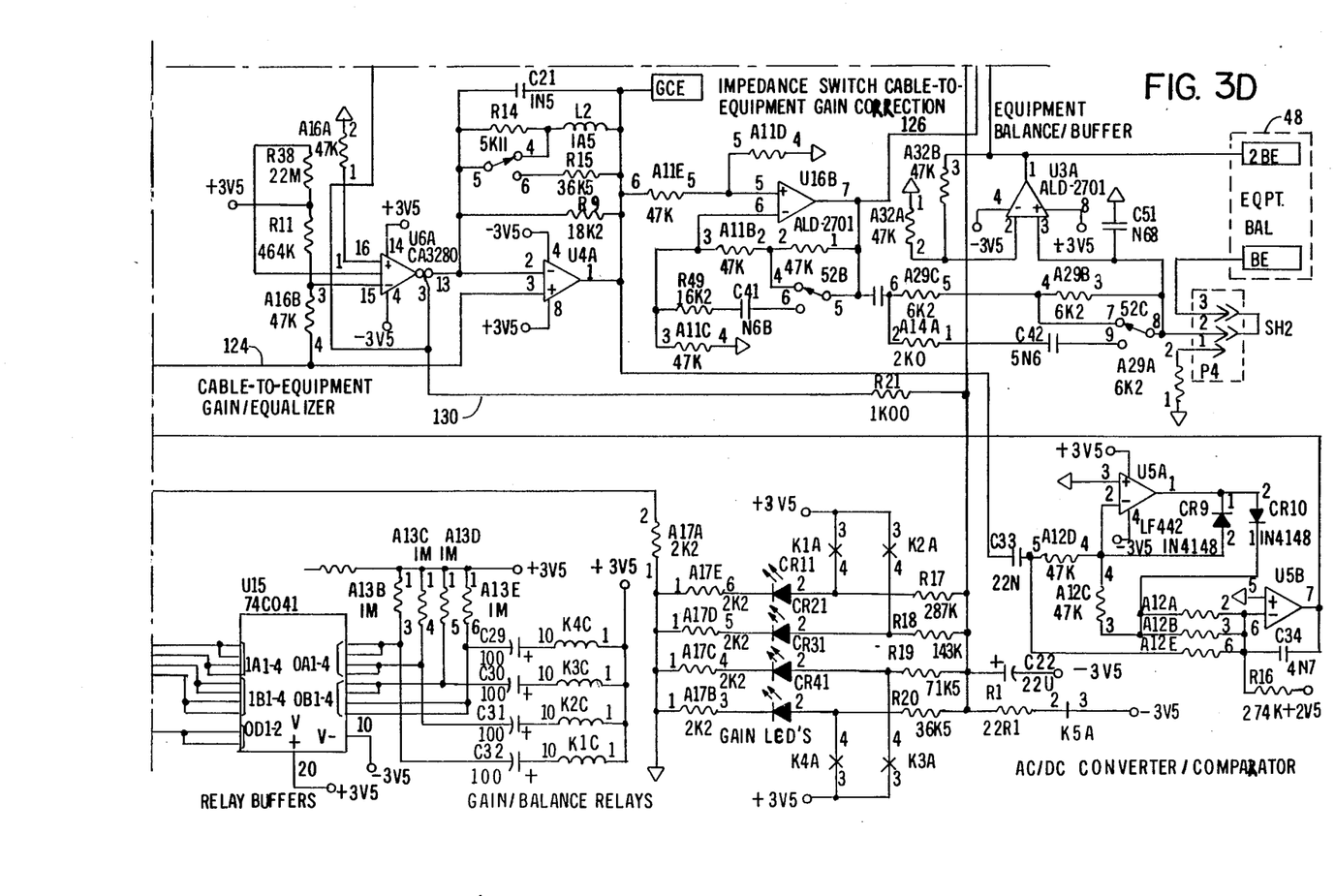

In order to provide gain for the signals originated from the central office and arriving at the cable side port 60 as a cable side voltage $V_c$, the output voltage from the CE sense amplifier 64 (U2A) representing the cable side voltage is delivered via line 124 to the gain/equalizer circuit 36a which is formed of a transconductance amplifier U6A, a one-plus gain amplifier U4A, and a gain correction amplifier U16B (FIG. 3D). With the switch S2B in the position shown, the amplifier U16B merely provides unity gain. The output of the amplifier U16B on line 126 drives the equipment side using the shunt current driver U1A via a current $I_o$ into the parallel-connected resistors A2F and A2G equivalent 50 K) at the non-inverting input of the shunt current driver U1A (FIG. 3B) via contact 17 and 18 of the switch S2F. Thus, there is created an output voltage across the equipment side 600 ohms resistance having a gain from the cable side to the equipment side. To force this shunt output current to pass to the equipment side, the output of the amplifier U16B must also drive the parallel-connected resistors A3F and A3G (equivalent 50 K) at the inverting input of the current compensator U1B. The current $I_o$ is the difference between the cable current $I_c$ and the desired equipment current $I_E$. In other words, the current drivers U1A and U1B function as an "additive" type hybrid repeater which is like an analog computer generating an output current $I_o$ which adds or subtracts from the existing signal current on the line to create gain/loss and/or impedance change as required to produce the same net result as a conventional hybrid repeater.

Similarly, in order to provide gain for signals originating from the telephone 24 and arriving at the equipment side port 62 as an equipment side voltage $V_E$, the output voltage from the EC sense amplifier 66 (U2B) representing the equipment side voltage is delivered via line 124a through the switch S1A and a low pass filter inductor L3 and capacitor C35) to the gain/equalizer circuit 38a. The circuit 38a is formed of a gain correction amplifier U16A, a transconductance amplifier U6B, and a one-plus gain amplifier U4B (FIGS. 3A and 3B). With the switch S2A in the position shown, the amplifier U16A merely provides unity gain. The output of the amplifier U4B on line 126a creates a shunt output current by driving a current $I_o$ into the parallel-connected resistors A2O and A2E (equivalent 50 K) of the shunt current driver U1A. Therefore, there is created an output voltage across the cable side 600 ohms resistance having a gain from the equipment side to the cable side. To force this current to pass to the cable side, the output of the amplifier U4B must also drive the parallel-connected resistors A4B and A4E (equivalent 50 K) of the current compensator U1B.

In order to prevent the signals originating from the cable side and sensed by the amplifier U2B from being returned to the cable side, there is performed what is known as a hybrid cancellation on the equipment side. This is achieved by the amplifier UI6B which also drives the equipment side balance network 48 through the source resistance A29C (6.2 K), which is equivalent to 600 ohms, and a buffer U3A. Since the amplifier U2B also senses the voltage across the equipment side, another input from the equipment side balance network 48 is required and added to cancel this effect. This is provided for by a path through the capacitor C46 and resistor ABE to the inverting input of the amplifier U2B. Thus, when the balance network is adjusted to match the termination connected to the equipment side, little or no voltage should appear at the output of the amplifier U2B. This provides the hybrid cancellation required.

However, it will be noted that this will create an undesired path from the equipment balance network 48 through the amplifier U2B into the shunt current driver U1A. In order to correct or cancel this error, an additional input signal from the balance network 48 is fed via resistor A1F into the current driver U1A and also the current compensator U1B via A4F. Therefore, the error created by the undesired path through the amplifier U2B will have no effect on the output of the shunt current driver U1A.

A similar cable side balance is performed for the signals originating from the equipment side. This is achieved by the amplifier U4B which drives the cable side balance network 44 through the source impedance (capacitor C16 and resistor A29E) and a buffer U3B. Since the amplifier U2A also senses the voltage across the cable side, another input from the cable side balance network 44 is required to cancel this effect. This is provided by a path through the capacitor C47 and parallel-connected resistors A5D and A5E to the inverting input of the amplifier U2A. Thus, little or no voltage should appear at the output of the amplifier U2A. This provides the hybrid cancellation required.

However, it will be noted that this establishes an undesired path from the cable balance network 44 through the amplifier U2A into the shunt current driver U1A. In order to correct or cancel this error, an additional input from the balance network 44 is fed via parallel-connected resistors A1C and A1D into the current driver U1A. Therefore, the error created by the undesired path through the amplifier U2A will have no effect on the output of the shunt current driver U1A.

In order to create the desired side tone level when the equipment side is connected to the telephone 24, it is required to generate an impedance on the equipment side which simulates non-loaded cable. In other words, the input impedance to be generated is not 600 ohms but rather 1200 ohms in parallel with a series connection of 200 ohms+60 nf or some other desired value. This is achieved by the provision of a six pole switch S2. As will be recalled, the amplifier U2B is used to generate the 600 ohms by driving the shunt current driver U1A via the contacts 14 and 15 of the switch S2E and the resistor A1G (100 K). By moving the switch S2E to the other position, the output of the amplifier U2B drives the shunt current driver U1A via a first path through resistors A28B (47 K) and A1G (100 K). The amplifier U2B also drives the shunt current driver U1A via a second path of a lower resistance in parallel with the first path. The second path is through the contacts 14 and 13 of the switch S2E. resistor A27D (33 K) and capacitor C3G (68 nf). When this is scaled down by a factor of 100, there is generated approximately the 1200 ohms in parallel with the 200 ohms+68 nf.

Since the current driver U1A is not only used to generate the simulated terminating impedance but also provides the gain, it is required to drive the gain part of the shunt current driver U1A and the series current compensator U1B through similar impedance networks so as to prevent a gain error. A first network is composed of resistors A2BC, A28D, A2F, A2G; capacitor C37; and resistor R46. A second network is comprised of resistors A28C, A28D, A3F, A3G; capacitor C38; and resistor R47. A third network is comprised of resistors A28A, A4F, A1F, A27D, A27B; and capacitor C39. The switches S2D, S2E and S2F are used to switch in and out these respective networks.

In addition, the output of the amplifier U16B must drive the equipment balance network 48 through a similar impedance network rather than the 600 ohms (A29C). When the switch S2C is moved to the other position, the contacts 8 and 9 cause the series connection of resistor A14A (2 K) and the capacitor C42 (56 nf) to be in parallel with the series-connected resistors A29C (6 K) and A29B (6 K). When this is scaled down by a factor of 10, there is again presented approximately the 1200 ohms in parallel with 200 ohms+68 nf.

When the switches S2E, S2O, S2F, and S2C are moved to the other position to match the phone impedance, there are created errors in the gain from the two-wire paths from the equipment side and cable side. In order to correct for this error, there are provided the gain correction amplifier U16B and its associated components to correct for the gain in the eastward path and the gain correction amplifier U16A and its associated components to correct for the gain in the westward path. The gains of the amplifiers U16B and U16A are changed by the respective switches S2B and S2A.

The gain in the eastward path is also effected by the gain/equalizer network 36a (transconductance amplifier U6A and the one-plus amplifier U4A). It can be seen that the amplifier U2A (FIG. 3C) drives both the amplifiers U6A and U2A (FIG. 3D). When the transconductance amplifier U6A is turned off via control line 130, its output will have an infinite impedance. Thus, the amplifier U4A provides a gain of 1. As the amplifier U6A is turned on, its output resistance decreases down to about 10 K ohms. Then, the amplifier U4A provides a gain of 1+18 K/10 K, where 18 K is the resistance of the tank circuit (inductor L2 and capacitor C21) at resonance. For the values shown, the resonance frequency is 2.8 KHz. Thus, the gain is about 9.0 db at 2.8 KHz and will decrease to a maximum of 4.5 db at 1 KHz. When the gain switch S3B is moved to the other position, this lowers the Q of the tank circuit and thus lowers the gain at the frequency of 2.8 KHz. The switch S3B is thus used to select the gain/equalizer circuit 36a for loaded cable or non-loaded cable.

The gain in the westward path is also effected by the gain/equalizer circuit 38a (transconductance amplifier U6B and one-plus amplifier U4B). The amplifiers U6B and U4B and their associated components operate in an identical manner, as just described with respect to amplifiers U6A and U4A. Similarly, the switch S3C is used to select the gain/equalizer network 38a for loaded of non-loaded cable.

Referring now to FIG. 2 and FIGS. 3C and 3D, the automatic gain adjustment circuitry 40 will be explained. The 1 KHz signal arriving at the cable side is sent from the output of the CE amplifier 64 (U2A) on line 132 to the 1 KHz detector 41 (U13) via a resistor R40 and capacitor C23. The 1 KHz detector U13 is a tone decoder I.C. chip whose frequency is determined by resistor R39 and capacitor C24. When the presence of this signal is detected, the output of the detector U13 on pin 8 will go low, which is approximately −3.5 volts. If the switch S1B is then depressed, this causes the 5 Hz clock generator 72 (U19C) to initially reset the 4-bit counter 74 (U14) and allows it to begin counting. The resistor A25C and capacitor C14 is used to set the frequency of the 5 Hz clock generator 72. The outputs QA, QB, QC and QD of the counter U14 will count binarily from 5 to 15 in steps corresponding to 0.3 db gain per step. The outputs of the counter U14 are fed to a buffer 76 (U15). The buffer U15 (FIG. 3D) drives a plurality of latching-type relay coils K4C–K1C via respective capacitors C29–C32 with pulses.

As the gain increases, the various relay coils will also activate the corresponding light-emitting diodes CR1–CR4 located on the face panel (FIG. 5), thereby indicating the gain setting that is being applied. Initially, the output of the buffer will be set to ö ö ö ö and all of the relay coils will be de-energized. The 1 KHz output of the gain/equalizer circuit 36a (output of amplifier U4A) is converted to a d.c. level by the AC-to-DC converter 80 (U5A). A comparator U5B compares this d.c. level with the −4 dBm reference D.C. level set by the resistor R16. If the d.o. level is too low, the output of the comparator U5B will cause the counter U13 to continue to count. The counter will continue to count until the output level from the converter U5A reaches the reference level. At that point, the output of the comparator U5B will switch to a low level. This low level is inverted by the amplifier U19D whose output will cause the counter U14 to stop. The driver U15 also will hold its count and the value of the relays will be held indefinitely.

In addition, the relays control the binarily weighted resistors R17–R20 which set the current into the transconductance amplifiers U6A. U6B and thus their output impedance. As a result, this output on the line 130 controls or varies the impedances and thus the gain of the amplifiers U4A and U4B. A capacitor C22 is used to control the gain changing speed as the resistors R17–R20 must charge up this capacitor before a gain change can be effected. Zener diodes CR11 and CR12 are used to deactivate the gain due to high or overload signals from the current driver U1A and current compensator U1B. Contacts 2 and 3 of relay K5A prevent the addition of gain until there is loop current flowing and during the dial pulse brake when dialing to prevent chirping which could occur with dialing transients.

Referring now to FIG. 2 and FIGS. 4A and 4B, the details and operation of the auto-balancing circuitry 50 for adjusting automatically and continuously the cable side and equipment side balance networks 44 and 48 will be explained. For the signals originating at the equipment side such as by the telephone 24, the signals will arrive at the equipment side port 62 and the cable side balance network 44 will be adjusted continuously by the auto-balancing circuitry 50. For signals originating at the cable side, these signals will arrive at the cable side port 60 and the equipment side balance network 48 will be adjusted continuously by the auto-balancing circuitry 50.

For the case where the signals are being transmitted from the equipment side, the signals on line 134 from the output of the equipment-to-cable gain/equalizer circuit 38a (U4B) will be larger than the signals on line 136 from the output of the cable-to-equipment sense amplifier 64 (U2A). When the multiplexer 88 (U20A–U20C) is moved to the other position by the 2 Hz clock generator 86 (U19B) the signals on line 134 will be passed through the filter 56 (capacitor 52 and inductor L4) and gate U20B of the multiplexer 88 to the AGC amplifier 90 (UBA) via resistor A19A. Simultaneously, the signals on the line 136 will be passed through the filter 5B (capacitor C54 and inductor L5) and the gate U20C of the multiplexer to the AGC amplifier 92 (U88) via resistor A19F.

In order to adjust optimally the cable side balance network 44, the high frequency energies above 1 KHz are required for the correlation rather than the low frequency energies. Therefore, the filters 56 and 58 are designed to have a bandpass range of 1 KHz to 3 KHz. The output of the AGC amplifiers 90 and 92 are fed to the inputs of the correlator or multiplier U11. The AGC amplifiers serve to maintain the inputs at a level so as to be within the linear dynamic range of the multiplier U11, thereby insuring accurate correlation.

For low signal input levels, the output of the amplifiers 90 and 92 will be relatively low and the transistors Q6 and Q8 will be non-conductive. As the input levels increase, the output of the amplifiers will cause the transistors Q6 and Q8 functioning as active diodes to turn on. As a result, the voltage on the capacitors C75 and C56 will be charged up negatively. The resistors A18E and R22 and Schottky diodes CR19, CR20 are used to set the bias voltages on the respective capacitors C75, C56 so that a correlation is performed only when the input levels are sufficiently high. The bias resistors R23, R24 are provided to quickly discharge the capacitor C75, C56 for low input signals.

The voltages on the capacitors C75, C56 will be detected by the transconductance amplifier U9A and will turn on the driver 96 (U9B) via an emitter follower U9C if the output level from the AGC amplifier UBA is larger than the output level from the AGC amplifier U88. If there is a correlation between the two signals on the lines 134 and 136, a d.c. voltage will appear at the output of the multiplier U11 which is converted to a current by the transconductance amplifier driver U9B. This d.c. current will be integrated by the capacitor C59 since the multiplexer gate U20A will be in the correct position.

The capacitor C57 (FIG. 4B) functions to control the turn on time constant of the multiplier U11. If an overload signal is generated from the shunt current driver U1A (FIG. 3B) or the current compensator U1B. the voltage on the capacitor C57 will be discharged so as to quickly terminate the correlation. The transistors Q9 and Q10 form a pulse circuit to discharge the capacitor C57 each time the multiplier U11 is switched between the equipment side and cable side balance networks. This allows the AGC amplifiers and the multiplier U11 to settle down before additional information is provided to the capacitors C59 and C60.

The cable balance network 44 is basically formed of a control section 44a and a variable cable balance impedance section 44b. The control section 44a is comprised of a transconductance amplifier U10A and the buffer 102 (U17B) The cable balance impedance section 44b is comprised of a continually adjustable portion (capacitor C62 and resistor R35) representing a nominal build-out capacitance: and resistors R50–R58: capacitors C65–C70 and relay contacts K1B–K48 which form a gain controlled portion. The voltage on the capacitor C59 is fed through a buffer U18B to the control section 44a.

It will be noted that the output of the buffer U18B is fed to the inputs of the transconductance amplifier U10A and the buffer U17B. The buffered voltage on the line 138 from the actual balance on the cable side is used to vary the current in the transconductance amplifier U10A and thus its output impedance. This buffered voltage is also fed to the non-inverting input of the buffer U17B via resistor A23E. The current at the output of the amplifier U10A will be " ö " when the control input voltage connected to the amplifier U10A via resistor A230 is "δ". As a result, the buffer U17B will provide a gain of +1. Therefore, the same voltage will appear on both sides of the series-connected capacitor C62 and resistor R35 and thus no current will flow. As the control input voltage is made positive or negative, the capacitor C62 and the resistor R35 will become either a build-out capacitance of ±1 or reduces or increases the existing build-out capacitance, i.e., capacitor C63 and resistor R42.

For loaded cable, the switch S3A is moved to the other position. Consequently a peak impedance is created in the cable balance impedance section 44b by the inductor L6 and the capacitors C61 and C78. Since the capacitor C64 shorts out effectively the resistors R50–R58 and capacitors C65–C70, the control is achieved primarily by the inductor L6 capacitor C61, and the adjustable build-out oapaoitanoe of capacitor C62 and resistor R35.

In a similar manner, when the signals are being transmitted from the cable side, the signals on line 140 on the output of the cable-to-equipment gain/equalizer circuit 36a (U4A) will be larger than the signals on the lines 142 from the output of the equipment-to-cable sense amplifier 66 (U2B). With the multiplexer 88 having the gates U20A–U20C) in the positions shown, the signals on the line 140 will pass directly through the AGC amplifier UBA to pin 9 of the multiplier U11. Similarly, the signals on the line 142 will pass directly through the AGC amplifier UBA to pin 4 of the multiplier U11. Again, the detector U9A will detect when the amplitude of the signals from the amplifier U4A is larger than the signals from the amplifier U2B and will thus turn on the driver U9B. The output of the multiplier U11 will drive the transconductance amplifier U9B to charge the capacitor C60 when there is a correlation.

The equipment balance network 48 is formed of a control section 48a and a variable equipment balance section 48b. The control section 48a is comprised of a transconductance amplifier U10B and the buffer 100. Since the tip and ring leads on the equipment side are normally connected to the telephone 24 or a 600 ohm impedance and are not sent to a loaded or non-loaded cable, the equipment balance network 48 is comprised simply of a resistive component R34.

The voltage on the capacitor C60 is fed through a buffer U1BA to the control section 48a. The control voltage from the buffer U1BA drives the amplifiers U10B and U17A and will cause the voltage across the resistor R34 to appear as positive or negative so as to raise or lower the effective impedance. When the voltage across the resistor R34 is positive, it will lower the shunted resistors A14B and A14C to provide a resistance of 2500 ohms, which represents 250 ohms when scaled down by a factor of 10. When the voltage across the resistor R34 is negative, it will cause the resistors A14B and A14C to appear as 9 K or 10 K, which represents 900 ohms or 1000 ohms when scaled down.

From the foregoing detailed description, it can thus be seen that the present invention provides an enhanced line powered amplifier for interconnecting a two-wire, bidirectional cable side path and a two-wire bidirectional equipment side path in a communication which includes a first hybrid repeater and a second hybrid repeater Further, there is provided automatic gain adjustment circuitry for automatically setting the gain in gain/equalizer circuit at a fixed level. In addition, auto-balancing circuitry is provided to adjust automatically and continuously both equipment and cable side balance networks. Moreover, the auto-balancing circuitry may be applied to any balancing network that balances a 4-wire to 2-wire circuit, such as would be used in line cards of a PBX or central office 4-wire switch, or in terminating oircuits such as used in digital or subscriber carrier.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. An enhanced amplifier for interconnecting a two-wire, bidirectional cable side transmission path and a two-wire, bidirectional equipment side transmission path in a communication system, said line powered amplifier comprising:

first hybrid splitter means coupled to receive first signals originating from the cable side transmission path and arriving at a cable side port for amplifying and transmitting said first signals to the equipment side transmission path via an equipment side port;

second hybrid splitter means coupled to receive second signals originating from the equipment side transmission path and arriving at the equipment side port for amplifying and transmitting said second signals to the cable side transmission path via the cable side port;

said first splitter means including cable-to-equipment voltage sense amplifier means, shunt current driver means, and series current compensator means, said cable-to-equipment sense amplifier means being coupled to said cable side port for generating a cable side voltage, said shunt driver means and said series current compensator means being responsive to said cable side voltages for generating a first current which is passed to said cable side transmission path to provide a first simulated terminating impedance;

said second splitter means including equipment-to-cable voltage sense amplifier means, said shunt current driver means, and said series current compensator means, said equipment-to-cable voltage sense amplifier means being coupled to said equipment side port for generating an equipment side voltage, said shunt driver means and said series current compensator means being responsive to said equipment side voltage for generating a second current which is passed to said equipment side transmission path to provide a second simulated terminating impedance;

cable-to-equipment gain/equalizer circuit means being also responsive to said cable side voltage for generating a cable-to-equipment gain control voltage, said shunt driver means and said series current compensator means being responsive to said cable-to-equipment gain control voltage for generating an amplified cable-to-equipment signal to said equipment side port;

equipment-to-cable gain/equalizer circuit means being also responsive to said equipment side voltage for generating an equipment-to-cable gain control voltage, said shunt driver means and said series current compensator means being responsive to said equipment-to-cable gain control voltage for generating an amplified equipment-to-cable signal to said cable side port; and equipment side balance network means being also responsive to said cable side voltage for preventing said first signals originating from the cable side transmission path and sensed by said equipment-to-cable sense amplifier means from being returned to said cable side port.

2. An enhanced amplifier as claimed in claim 1, further comprising cable side balance network means being also responsive to said equipment side voltage for preventing said second signals originating from the equipment side transmission path and sensed by said cable-to-equipment sense amplifier means from being returned to said equipment side port.

3. An enhanced amplifier as claimed in claim 1, further comprising automatic gain adjustment means being responsive to a detection signal generated from the cable side transmission path and arriving at the cable side port when switch means is activated for automatically setting the gain of said cable-to-equipment gain/equalizer circuit means and said equipment-to-cable gain/equalizer circuit means.

4. An enhanced amplifier as claimed in claim 2, further comprising auto-balancing means responsive to said cable side voltage and said equipment-to-cable gain control voltage for adjusting automatically and continuously said cable side balance network means to match impedance on said cable side transmission path. said auto-balancing means being responsive to said equipment side voltage and said cable-to-equipment gain control voltage for adjusting automatically and continuously said equipment balance network means to match impedance on said equipment side transmission path.

5. An enhanced amplifier as claimed in claim 4, wherein said auto-balancing means includes multiplexer means for switching alternately its input between said cable side port to adjust said equipment balance network means and said equipment side port to adjust said cable balance network means.

6. An enhanced amplifier as claimed in claim 1, further comprising cable-to-equipment gain correcting means coupled to said cable-to-equipment gain/equalizer circuit means and first gain switch means operatively connected to said cable-to-equipment gain correcting means for varying said cable side voltage when said first gain switch means is moved from a non-loaded cable position to a loaded cable position.

7. An enhanced amplifier as claimed in claim 6, further comprising equipment-to-cable gain correcting means coupled to said equipment-to-cable gain/equalizer circuit and second gain switch means operatively connected to said equipment-to-cable gain correcting means for varying said equipment side voltage when said second gain switch means is moved from a non-loaded cable position to a loaded cable position.

8. An enhanced amplifier as claimed in claim 1, further comprising power extractor means coupled between coils in a D.C. bypass line for generating positive and negative d.c. supply voltages for said line powered amplifier.

9. An enhanced amplifier as claimed in claim 1, wherein said cable-to-equipment gain/equalizer circuit means is comprised of a first transconductance amplifier whose output impedance is changed by a variable gain signal.

10. An enhanced amplifier as claimed in claim 9, wherein said equipment-to-cable gain/equalizer circuit means is comprised of a second transconductance amplifier whose output impedance is changed by said variable gain signal.

11. An enhanced amplifier as claimed in claim 10, wherein said automatic gain adjustment means is formed of a 1 KHz detector to generate the detection signal, a clock generator a counter, a AC/DC converter, a comparator and a plurality of resistors for generating said variable gain signal.

12. An enhanced amplifier as claimed in claim 4, wherein said auto-balancing means is formed of AGC amplifier means and correlation circuit means for generating a cable side correlation signal only when said equipment-to-cable gain control voltage is higher than said cable side voltage and for generating an equipment side correlation signal only when said cable-to-equipment gain control signal is higher than said equipment side voltage.

* * * * *